US009396593B2

(12) United States Patent
Suwald et al.

(10) Patent No.: US 9,396,593 B2
(45) Date of Patent: Jul. 19, 2016

(54) SECURITY TOKEN, CONTROL SYSTEM AND CONTROL METHOD

(71) Applicant: NXP B.V., Eindhoven (NL)

(72) Inventors: Thomas Suwald, Hamburg (DE); Arne Burghardt, Hamburg (DE)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 14/187,283

(22) Filed: Feb. 23, 2014

(65) Prior Publication Data

US 2015/0137942 A1      May 21, 2015

(30) Foreign Application Priority Data

Mar. 19, 2013     (EP) ..................................... 13159947

(51) Int. Cl.
| | |
|---|---|
| *G07C 9/00* | (2006.01) |
| *G07F 7/10* | (2006.01) |
| *G06Q 20/40* | (2012.01) |
| *G07F 7/08* | (2006.01) |
| *G06F 21/34* | (2013.01) |
| *G06K 19/07* | (2006.01) |
| *G06K 19/077* | (2006.01) |

(52) U.S. Cl.
CPC ............ *G07C 9/00007* (2013.01); *G06F 21/34* (2013.01); *G06K 19/072* (2013.01); *G06K 19/0718* (2013.01); *G06K 19/0723* (2013.01); *G06K 19/07703* (2013.01); *G06K 19/07707* (2013.01); *G06Q 20/40145* (2013.01); *G07C 9/00063* (2013.01); *G07F 7/0833* (2013.01); *G07F 7/1008* (2013.01)

(58) Field of Classification Search
CPC .. G06F 21/34; G06K 19/0178; G06K 19/072; G06K 19/07703; G07C 9/00063; G07C 9/00007; G06Q 20/40145
USPC .......... 340/5.1–5.83; 70/46; 257/679; 726/20
See application file for complete search history.

(56) References Cited

U.S. PATENT DOCUMENTS

| | | | |
|---|---|---|---|
| 6,325,285 | B1 | 12/2001 | Baratelli |
| 2006/0016871 | A1 | 1/2006 | Bonalle et al. |
| 2006/0142063 | A1* | 6/2006 | Monsacre ............ G06K 7/0021 455/558 |

(Continued)

FOREIGN PATENT DOCUMENTS

| | | |
|---|---|---|
| DE | 10 2004 039365 A1 | 2/2006 |
| EP | 1 004 980 A2 | 5/2000 |

(Continued)

OTHER PUBLICATIONS

Extended European Search Report for Application 13159947.4 (Aug. 29, 2013).

(Continued)

*Primary Examiner* — Jennifer Mehmood
*Assistant Examiner* — Omar Casillashernandez (57) ABSTRACT

According to an aspect of the invention, a security token is conceived, in particular a smart card, comprising a tactile sensing user interface, wherein said tactile sensing user interface is adapted to capture a stream of authentication data corresponding to a sequence of positions of a finger engaging with said tactile sensing user interface and representing a user-specific credential for accessing at least one function of a controllable object, said security token being adapted to transmit said stream of authentication data to the controllable object in order to access said function.

14 Claims, 10 Drawing Sheets

(56) References Cited

U.S. PATENT DOCUMENTS

| | | | |
|---|---|---|---|
| 2007/0067642 A1* | 3/2007 | Singhal | G06F 21/32 713/186 |
| 2008/0148393 A1* | 6/2008 | Wendt | G06F 21/32 726/19 |
| 2010/0125362 A1* | 5/2010 | Canora | G06Q 20/3278 700/236 |
| 2011/0165836 A1* | 7/2011 | Dixon | G06Q 20/045 455/41.1 |
| 2012/0153870 A1* | 6/2012 | Kirkup | H05B 33/0863 315/312 |
| 2013/0152185 A1* | 6/2013 | Singh | G06F 21/35 726/9 |
| 2014/0173690 A1* | 6/2014 | Ekberg | H04L 63/08 726/3 |
| 2014/0270417 A1 | 9/2014 | Lin | |

FOREIGN PATENT DOCUMENTS

| | | | |
|---|---|---|---|
| EP | 1 424 658 A1 | 6/2004 | |
| EP | 2 575 084 A1 | 4/2014 | |
| WO | 2005/043451 A2 | 5/2005 | |
| WO | 2009/095263 A1 | 8/2009 | |
| WO | WO 2009095263 A1 * | 8/2009 | G06F 21/00 |

OTHER PUBLICATIONS

Extended European Search Report for Application No. 13159912.8 (Aug. 26, 2013).

* cited by examiner

SECURITY TOKEN, CONTROL SYSTEM AND CONTROL METHOD

CROSS-REFERENCE TO RELATED APPLICATIONS

This application claims the priority under 35 U.S.C. §119 of European patent application no. 13159947.4, filed on Mar. 19, 2013, the contents of which are incorporated by reference herein.

FIELD OF THE INVENTION

The invention relates to a security token. Furthermore, the invention relates to a control system. Furthermore, the invention relates to a control method.

BACKGROUND OF THE INVENTION

For many reasons, controllable objects such as machines and devices need to be protected against unintended use by unauthorized third parties. These controllable objects may be power plant controls, sensitive production line controls or safety-relevant devices in hospitals. There are many controllable objects that require protection against unintended access. State-of-the-art protection schemes are typically based on single-factor authentication (e.g. the use of a key or a password) or two-factor authentication (e.g. the use of a card and a password). Incidents have been reported were an authorized user authenticated towards a controllable object and subsequently left the controllable object unattended without logging off. In such a case the controllable object becomes vulnerable against unauthorized manipulation. Furthermore, in harsh environments (e.g. explosion-endangered areas) expensive keyboards or touch screens are normally required to provide user access for data entry.

SUMMARY OF THE INVENTION

It is an object of the invention to facilitate a secure control of a controllable object of the kind set forth, in particular a secure control of a function of said controllable object. This object is achieved by a smart card as claimed in claim 1, by a control system as claimed in claim 10, and by a control method as claimed in claim 14.

According to an aspect of the invention, a security token is conceived, in particular a smart card, comprising a tactile sensing user interface, wherein said tactile sensing user interface is adapted to capture a stream of authentication data corresponding to a sequence of positions of a finger engaging with said tactile sensing user interface and representing a user-specific credential for accessing at least one function of a controllable object, said security token being adapted to transmit said stream of authentication data to the controllable object in order to access said function.

According to an exemplary embodiment, the security token is further adapted to support multi-factor user authentication.

According to a further exemplary embodiment, the tactile sensing user interface is further adapted to capture a stream of control data corresponding to a sequence of positions of a finger engaging with said tactile sensing user interface and representing input data for controlling said function, said security token being adapted to transmit said stream of control data to the controllable object in order to control said function.

According to a further exemplary embodiment, the security token further comprises a storage unit, wherein said storage unit is adapted to store access rights for accessing said function and/or control rights for controlling said function.

According to a further exemplary embodiment, the access rights and/or control rights are written to the security token by an NFC-enabled mobile device.

According to a further exemplary embodiment, the access rights and/or control rights are written to the security token by a contactless reader or a contact-bound reader.

According to a further exemplary embodiment, the user-specific credential is a personal identification number.

According to a further exemplary embodiment, said security token comprises a contact-based interface for transmitting data to the controllable object.

According to a further exemplary embodiment, said security token comprises a contactless interface for transmitting data to the controllable object.

According to a further exemplary embodiment, the security token is further adapted to generate user feedback, in particular user feedback about control operations performed on said function.

According to a further exemplary embodiment, the security token is further adapted to transmit display data to an external display device, in particular display data representing a log of control operations performed on said function.

According to a further exemplary embodiment, the security token is further adapted to facilitate epidemic data transport between a plurality of controllable objects.

According to a further aspect of the invention, a control system is conceived that comprises a security token of the kind set forth and a controllable object, wherein the controllable object is adapted to receive the stream of authentication data, to verify the user-specific credential represented by said stream of authentication data, and to grant the security token access to said function upon or after successful verification of the user-specific credential.

According to a further exemplary embodiment, the controllable object is further adapted to send configuration data to the security token upon or after successful verification of the user-specific credential, and wherein the security token is further adapted to configure the tactile sensing user interface using said configuration data.

According to a further exemplary embodiment, the controllable object is further adapted to send a log of control operations performed on said function to the security token.

According to a further exemplary embodiment, the controllable object is one of the group of: a room entrance, a building entrance, a machine, a device, a vehicle, a vessel, a software application.

According to a further aspect of the invention, a control method is conceived, wherein a tactile sensing user interface comprised in a security token, in particular in a smart card, captures a stream of authentication data corresponding to a sequence of positions of a finger engaging with said tactile sensing user interface and representing a user-specific credential for accessing at least one function of a controllable object, and wherein the security token transmits said stream of authentication data to the controllable object in order to access said function.

BRIEF DESCRIPTION OF THE DRAWINGS

The invention will be described in more detail with reference to the appended drawings, in which.

DESCRIPTION OF EMBODIMENTS

In accordance with the present disclosure, the control of a security-relevant controllable object may be protected by means of a smart card that supports multi-factor authentication. More specifically, the authentication may be based on something a user has (e.g. a smart card, access rights), on something a user knows (e.g. a PIN) and on something a user is (i.e. a personal characteristic, such as a handwriting characteristic). The smart card may be a contactless, contact-based or dual-interface smart card adapted to act as both an access interface and a control interface to the controllable object. The controllable object may be equipped with a reader device in order to communicate with the smart card.

Furthermore, user-specific access rights may be stored on the smart card. These user-specific access rights prescribe which function(s) of the controllable object may be accessed by a user. These user-specific access rights may, for example, be received from the controllable object by an NFC-enabled mobile phone and transferred from the NFC-enabled mobile phone via NFC to the smart card. Alternatively, the user-specific access rights may be received from the controllable device by a contactless or contact-based reader, and transferred from the contactless or contact-based reader to the smart card via the respective contactless or contact-based communication channel. In addition, user-specific or application-specific control rights may be stored on the smart card. These user-specific or application-specific control rights prescribe how a user may control the accessed function(s) of the controllable object. Furthermore, a log of control events, i.e. control operations performed on said function, may be stored on the smart card for later retrieval.

The tactile sensing user interface (in short, "tactile sensor") embedded in the smart card may effectively be used as a two-dimensional pointing device that enables controlling at least one function of a controllable object similar to other pointing devices, for example a mouse. Thus, the smart card may act both as an access interface and a control interface to said function. Controlling said function is only possible if the smart card is connected to or attached to a reader connected to the controllable function whose function is to be controlled.

Implementing an access/control interface to a function of a controllable object is relatively low-cost compared to state-of-the-art access/control interfaces. Furthermore, it avoids critical components such as displays and mechanical buttons, and therefore it enables a solid mechanical construction that withstands strong mechanical stress. Thus, it may be used to control an environment-protected controllable object or a controllable object in an explosion-endangered environment. Furthermore, it enables battery-less operation, which results in increased reliability, extended operational lifetime, reduced cost and less recycling problems. The tactile sensor offers a user-friendly and intuitive tactile interface that also allows operation by visually impaired or elderly users, for example. The tactile sensor may be customized to specific applications and to user-specific definitions.

As mentioned above, upon or after successful verification of a user-specific credential captured by the tactile sensor, access may be granted to at least one function of the controllable object. Thereafter, this function may be controlled through the smart card, using the tactile sensor to capture control data. Thereby, the smart card may act as a secure two-dimensional pointing device for interactive control of the controllable object. For example, the smart card may act as a secure two-dimensional pointing device for interactive user menu control, a secure keypad for entry of numerical values, a secure keypad for entry of characters, or a secure control interface for predefined user-interface functions (menu functions).

In addition, the smart card may generate visible or audible user feedback to indicate the start of a control sequence and a success/fail of device control, for example. For this purpose the smart card may be equipped with a optical feedback indicator, for example a light emitting diode (LED), or an audio feedback unit. The user feedback may also take the form of display data to be presented to the user through an external device, such as a mobile device or a PC/laptop. For example, display data may be transmitted from the smart card to an NFC-enabled mobile device via NFC, or to a PC/laptop through a contact-bound or contactless reader. The smart card may offer a trainable reference code space with multilingual support (Western, Chinese, Japanese, Thai, Korean, etc.) Furthermore, the smart card may enable enrolment of user-dependent handwriting characteristics. Also, the smart card may enable firmware and algorithm updates (classification signature updates) to enable field maintenance, for example.

The smart card may be used to control a variety of controllable objects. For example, the controllable object may be one of the group of: a room entrance, a building entrance, a machine, a device, a vehicle, a vessel, a software application. The skilled person will recognize that other controllable objects may be controlled by means of said smart card as well.

Figure 1:
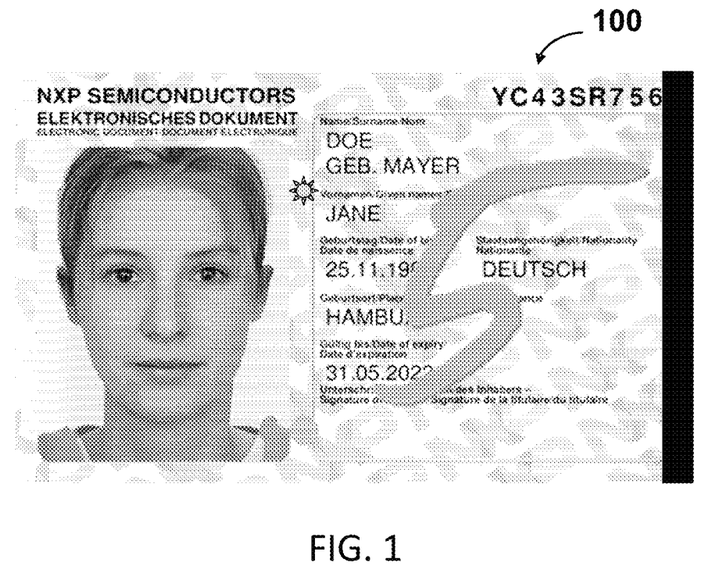
FIG. 1 illustrates an exemplary embodiment of a contactless smart card.

FIG. 1 illustrates an exemplary embodiment of a contactless smart card. In accordance with the present disclosure, the contactless smart card 100 comprises a two-dimensional tactile sensor adapted to locate the position of a finger engaging with the tactile sensor, as described above.

Figure 2:
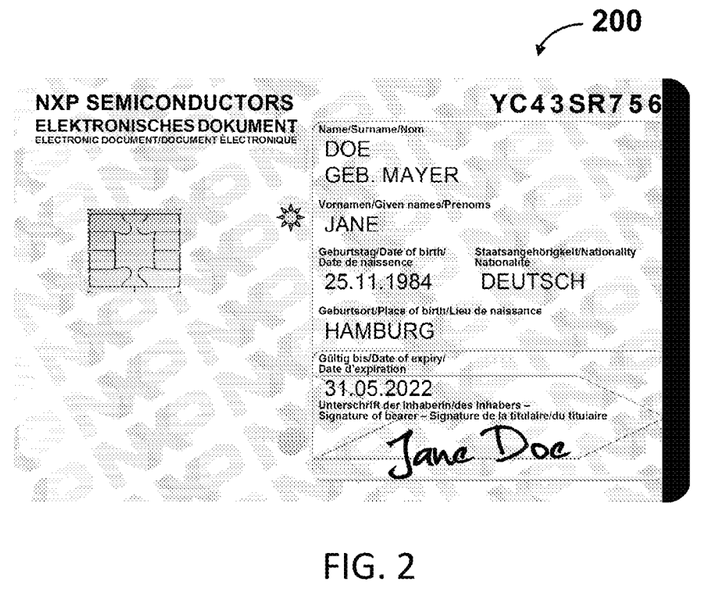
FIG. 2 illustrates an exemplary embodiment of a dual-interface smart card.

FIG. 2 illustrates an exemplary embodiment of a dual-interface smart card. In accordance with the present disclosure, the dual-interface smart card 200 comprises a two-dimensional tactile sensor adapted to locate the position of a finger engaging with the tactile sensor, as described above.

Figure 3:
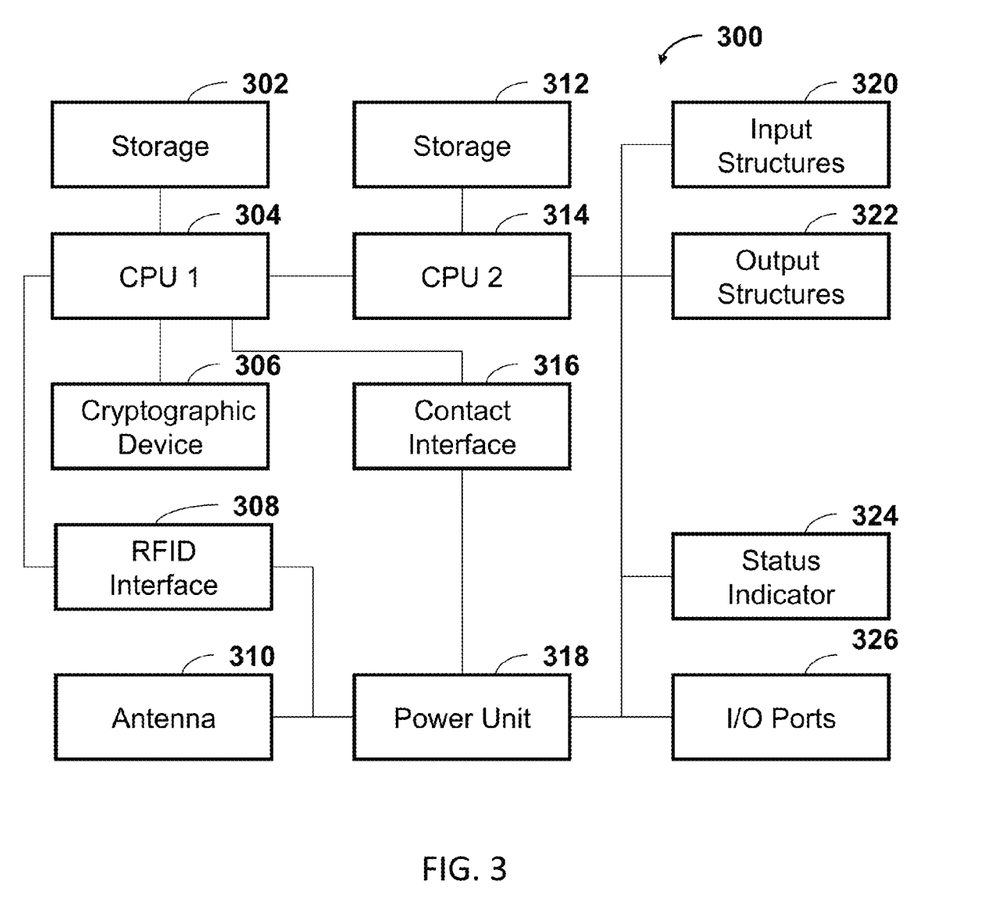
FIG. 3 illustrates a first example of a smart card system architecture.

FIG. 3 illustrates a first example of a smart card system architecture. In this example, the smart card 300 comprises storage units 302, 312, central processing units 304, 314, a cryptographic device 306, an RFID interface unit 308, an antenna 310, a contact-based interface 316, a power unit 318, input structures 320 and output structures 322, a status indicator 324 and input/output ports 326.

The smartcard 300 comprises a first CPU 304 and a second CPU 314 which may be configured by means of software for the required data processing. The power required by the smart card system may, in contactless operation, be obtained from a power unit 318 that rectifies the antenna signal from the antenna 310 and regulates it to the required voltage level. In contact mode the supply voltage provided by the contact interface 316 may be regulated by the power unit 318. In contactless mode the RFID interface unit 308 may demodulate the antenna signal in order to obtain the payload information from the controllable object. The RFID interface unit 308 may also modulate the payload information generated by the smart card system and may provide the modulated signal through the antenna 310 to the controllable object. In contact mode information exchange between the controllable object and the first CPU 304 may be implemented through an ISO7816 interface represented by the contact interface 316. The second CPU 314 may process tactile information provided by the input structures 320, may forward information to output structures 322 or to the status indicator 324 for user feedback, or it may change the electrical status of general input/output (GPIOs) devices. Firmware and data required to define the function of the first CPU 304 may be stored in a storage unit 302 attached to that CPU 304. Likewise, firmware and data required to define the function of the second CPU 314 may be stored in a storage unit 312 attached to that CPU 314.

Figure 4:
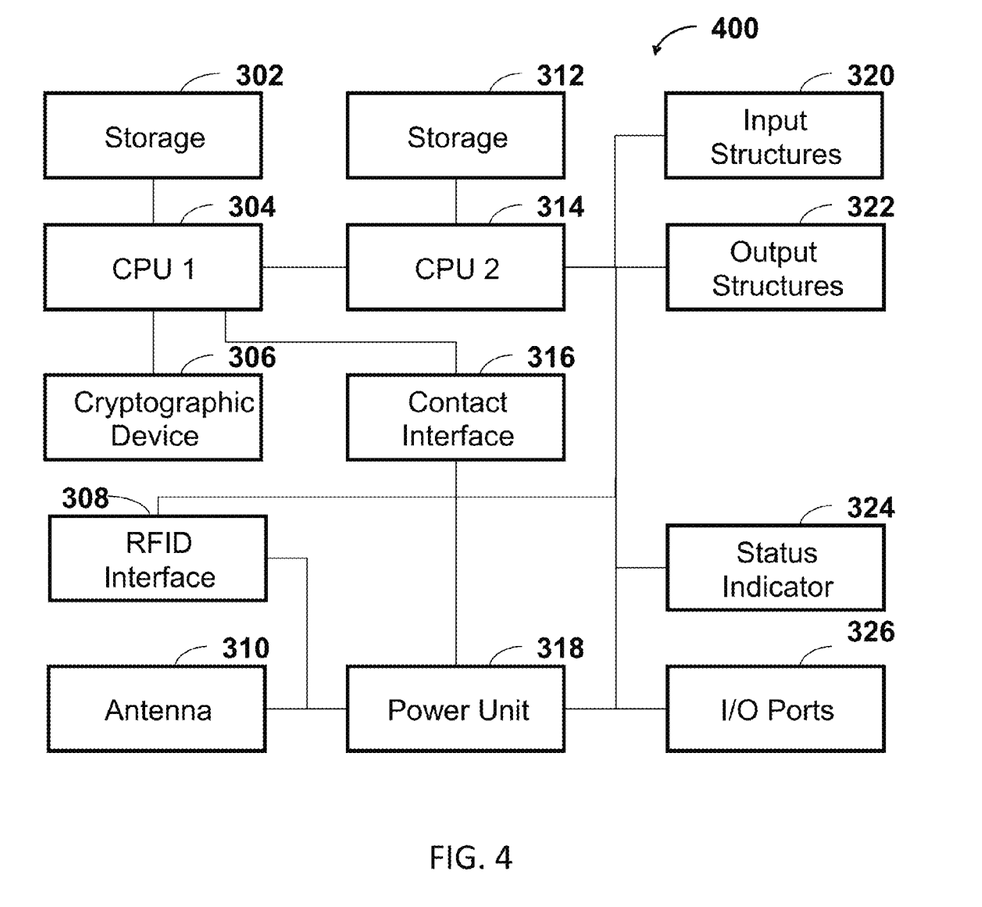
FIG. 4 illustrates a second example of a smart card system architecture.

FIG. 4 illustrates a second example of a smart card system architecture. In this example, the RFID interface unit 308 is connected to the second CPU 314 instead of to the first CPU 304. In this implementation the second CPU 314 performs a part of the ISO14443 decoding.

Figure 5:
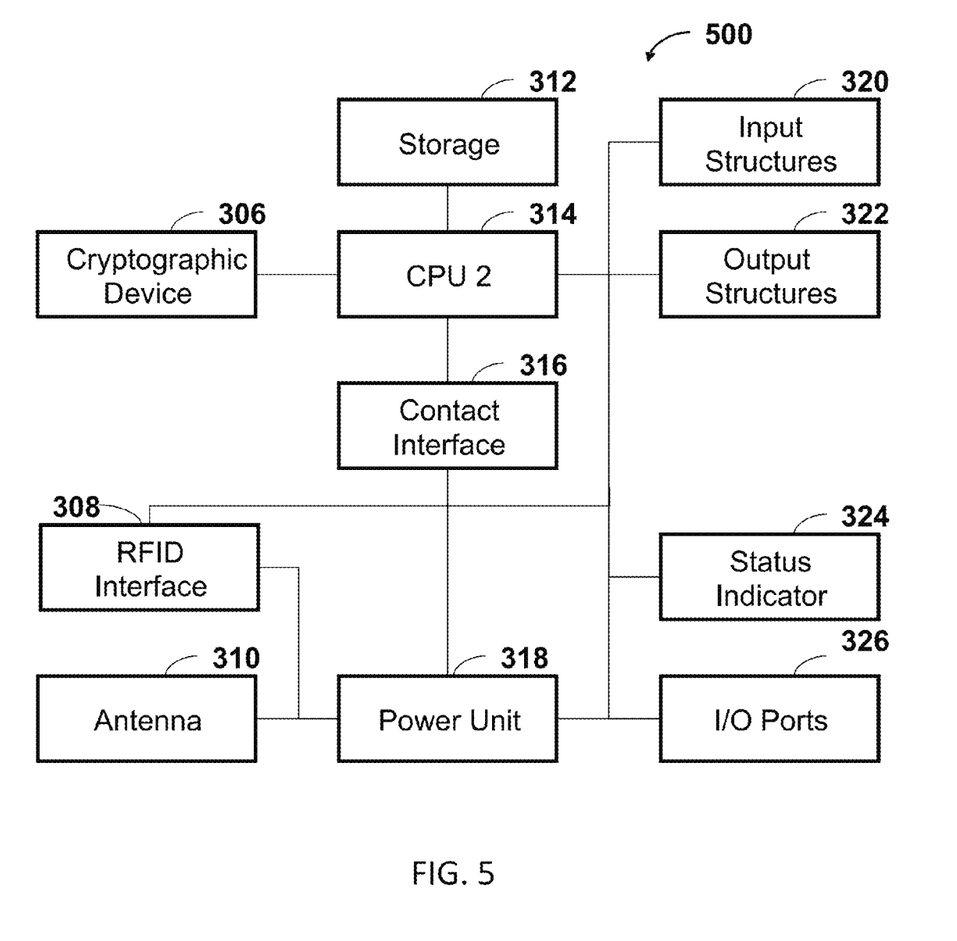
FIG. 5 illustrates a third example of a smart card system architecture.

FIG. 5 illustrates a third example of a smart card system architecture. In this example, the function of the first CPU 304 is taken over by the second CPU 314 and the RFID interface unit 308 is connected to the second CPU 314 in accordance therewith. In this implementation the second CPU 314 may perform a part of the ISO14443 decoding.

Figure 6:
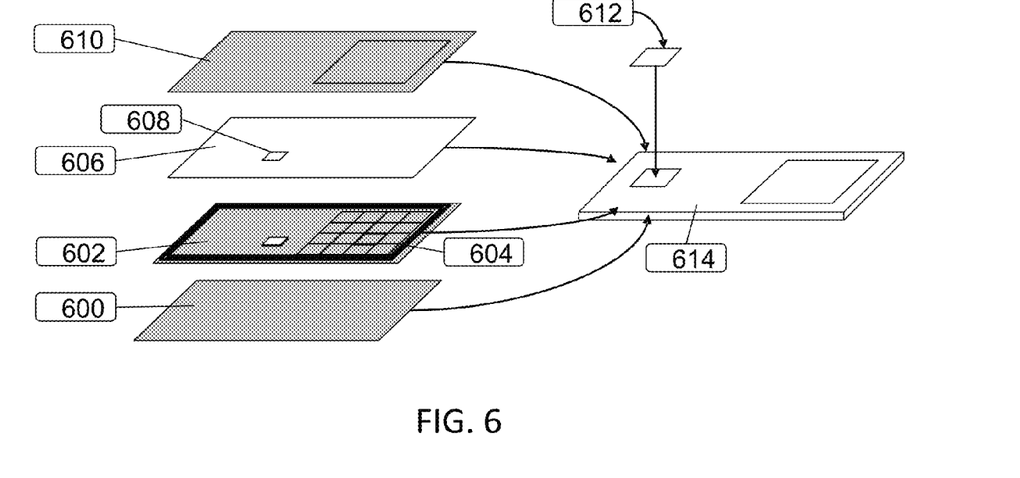
FIG. 6 illustrates how a smart card is fabricated from several components.

FIG. 6 illustrates how a smart card is fabricated from several components. In particular, a smart card of the kind set forth may be composed of bottom foil 600, a system inlay 602, a tactile interface 604, a compensation layer 606 having a cut-out 608, top foil 610, and a contact interface module 612. The assembled smart card 614 is shown on the right-hand side of FIG. 6.

In order to minimize costs, the smart card system may be assembled on a single substrate or system inlay 602 which is made from the same material as the embedding card. After lamination it may form together with the other card layers a solid block of material. Chip components may be assembled using direct chip attach, thus avoiding costly chip packages. Passive components may either be soldered by low-temperature solder or may be glued using isotropic conductive paste (ICP). A compensation layer 606 with a cut-out 608 at chip and component positions may be put on top of the substrate 602. A top layer 610 and a bottom layer 600 may complete the card construction. The card layers may either be directly laminated or thin glue layers may be used to link the various card layers.

In case of lamination without glue layers the substrate material may be identical to the embedding material except the softening temperature, which may have a higher softening temperature than that of the embedding material. As a consequence, the PCB structures on the substrate may be maintained during lamination. Polyurethane foil (TPU) may be used as glue layer. After card lamination an opening may be milled into the card's surface that may reach down to the substrate's connection layer. A contact module may be assembled into the milled cut-out either by ACA glue, ACF, NCA glue, NCF, by soldering or other means with the objective to fix the contact module. The contact module may be configured to provide contact between the contact modules surface and the smart card substrate in order to connect the contact interface to the related smart card components.

Figure 7:
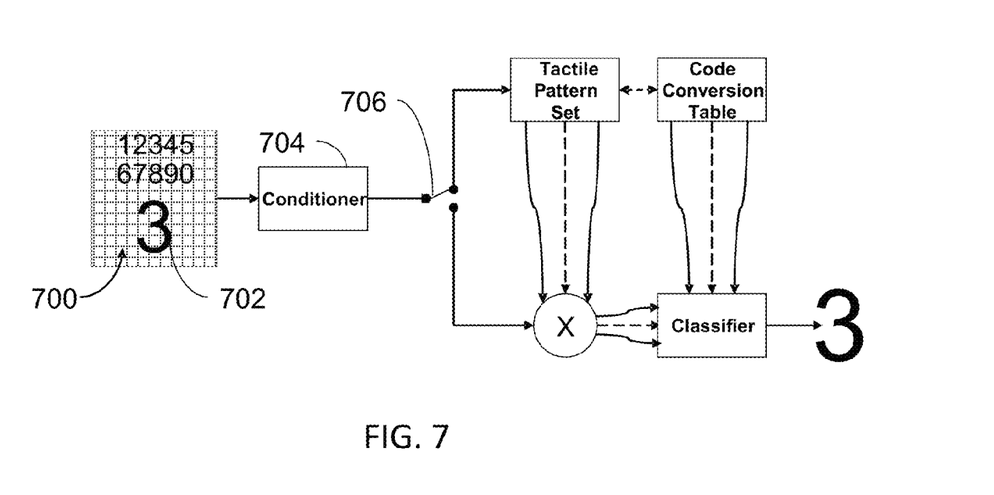
FIG. 7 illustrates the enrolment of tactile reference patterns in a smart card.
Figure 8:
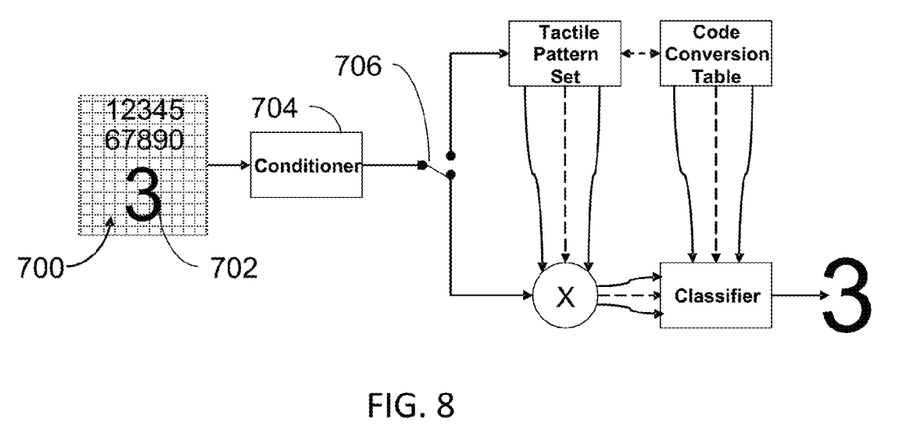
FIG. 8 illustrates the recognition of tactile reference patterns in a smart card.

FIG. 7 illustrates the enrolment of tactile reference patterns in a smart card. FIG. 8 illustrates the recognition of tactile reference patterns in a smart card. During authentication of a user the smart card may utilize data entry in handwritten format, for example as described in the European patent application titled "Security Token and Authentication System", application number EP12155351.5, filed on 14 Feb. 2012 by applicant NXP B.V., which is incorporated herein by reference. The decoding of handwritten user input data may be based on a tactile pattern recognition that comprises a tactile sensor interface 700 configured to capture tactile patterns 702, a tactile pattern conditioner 704 configured to make the tactile patterns machine-readable and a mode selector 706 that switches between a reference pattern capturing or enrolment mode (as shown in FIG. 7) and a recognition mode (as shown in FIG. 8). In the reference pattern capturing or enrolment mode the smart card is effectively in a "training mode" in which it is prepared for actual use.

In said enrolment mode a collection of tactile reference patterns representing a code alphabet may be stored in machine-readable format on the smart card. An additional code conversion table may be used to increase the code entropy. In said recognition mode entered tactile patterns may be converted into machine-readable format and then correlated against characters of the trained code alphabet stored in machine-readable format on the smart card. A classifier based on a correlator may determine the code alphabet member that has been entered. Multiple character entries may form a personal identification number (PIN) code.

In accordance with the present disclosure, additional modes may be defined for the smart card. For example, in a pointing mode the tactile data obtained from the tactile sensor may be converted into machine-readable position data that may be sent via the selected communication interface to the controllable object with the purpose to control said controllable object. The controllable object may be configured to act upon the position data by a predefined action. For safety reasons the pointing mode may involve a fail-home function based on position data corresponding to a finger engaging with the centre of the tactile sensor, thereby controlling the controllable object to a safe operational condition. For example, in case of a vehicle or a vessel, the safe operational condition means a speed of zero and a steering angle of zero. Furthermore, in a keypad mode the tactile data obtained from the tactile sensor may be used as key pad entry, where each number from 0 to 9 may correspond to a dedicated button area. Activating these button areas may result in generating the associated control data in machine-readable format and providing said control data to the controllable device.

Figure 9:
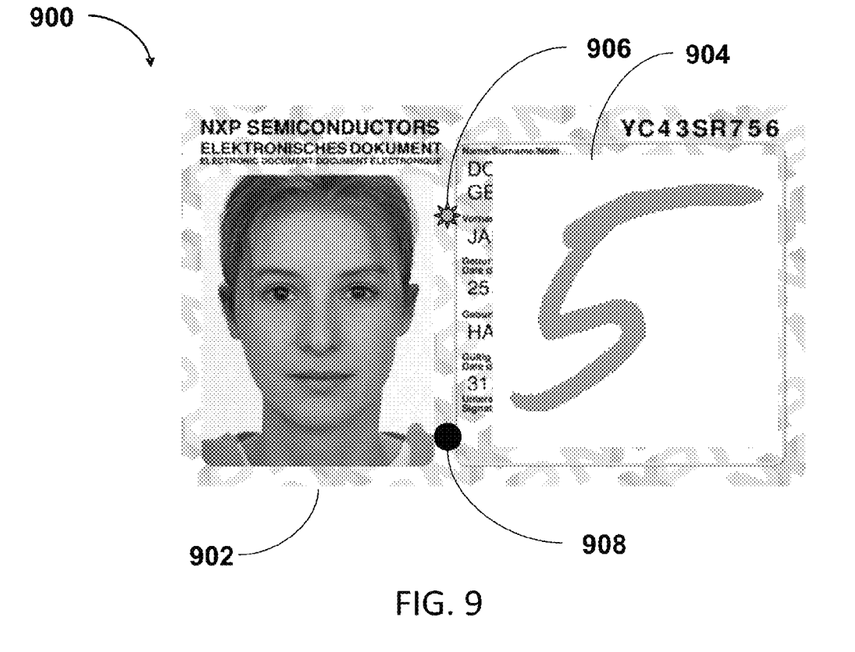
FIG. 9 illustrates various elements of a smart card.

FIG. 9 illustrates various elements of a smart card. In accordance with the present disclosure, a system 900 on, for example, a contactless or a dual-interface smart card 902 may comprise the following elements: a tactile interface 904, an optical feedback indicator 906 and an additional feedback unit 908.

A smart card of the kind set forth may be used in a variety of application areas. For example, in accordance with the present disclosure, if the smart card is configured as an access card, building or room access may be granted after successful multi-factor authentication. In case the controllable object is, for example, a machine, device, vehicle or vessel, access may also be granted after successful multi-factor authentication, with the purpose of controlling a function of the controllable object. Furthermore, user-specific and/or object-specific access rights and control rights may be stored on the smart card. The user-specific access rights and control rights allow a customized operation of a controllable object. The user-specific and/or object-specific access rights and control rights may be modifiable or configurable. Furthermore, a smart card of the kind set forth enables an epidemic transport of these user-specific and/or object-specific access rights and control rights to other controllable objects. This may enable reduction of maintenance cost. Furthermore, it is possible to create a log of control events reflecting executed control operations and to store said log on the smart card, for example.

As mentioned above, the smart card offers multi-factor authentication for granting access to buildings and rooms as well as to machines, devices, vehicles and vessels, for example. Once access has been granted the smart card may be configured by a control application executable by the controllable object or by a PC or laptop connected to the controllable object, in order to generate and provide control data to the controllable object utilizing an encrypted communication channel. Control over the controllable object may be exercised as long as the smart card of an authorized user is attached to a reading device connected to or comprised in said controllable object. Suitable interface devices between the smart card and the controllable object are contactless readers, e.g. compliant to the standard ISO14443, and contact-based readers compliant to the standard ISO7816.

As an example, the smart card may support the following multi-factor PIN-code authentication procedure. First, a user enters the requested PIN-code in his handwriting through the smart card's tactile sensing user interface. Subsequently, the smart card recognizes the entered PIN code in the recognition mode. Subsequently, the PIN code may be transmitted to the controllable object and verified by said controllable object. If the PIN code is valid, the smart card may receives configuration data from the controllable object. These configuration data prescribe how the tactile sensing user interface shall be configured in order to enable dedicated control over the controllable object.

Figure 10:
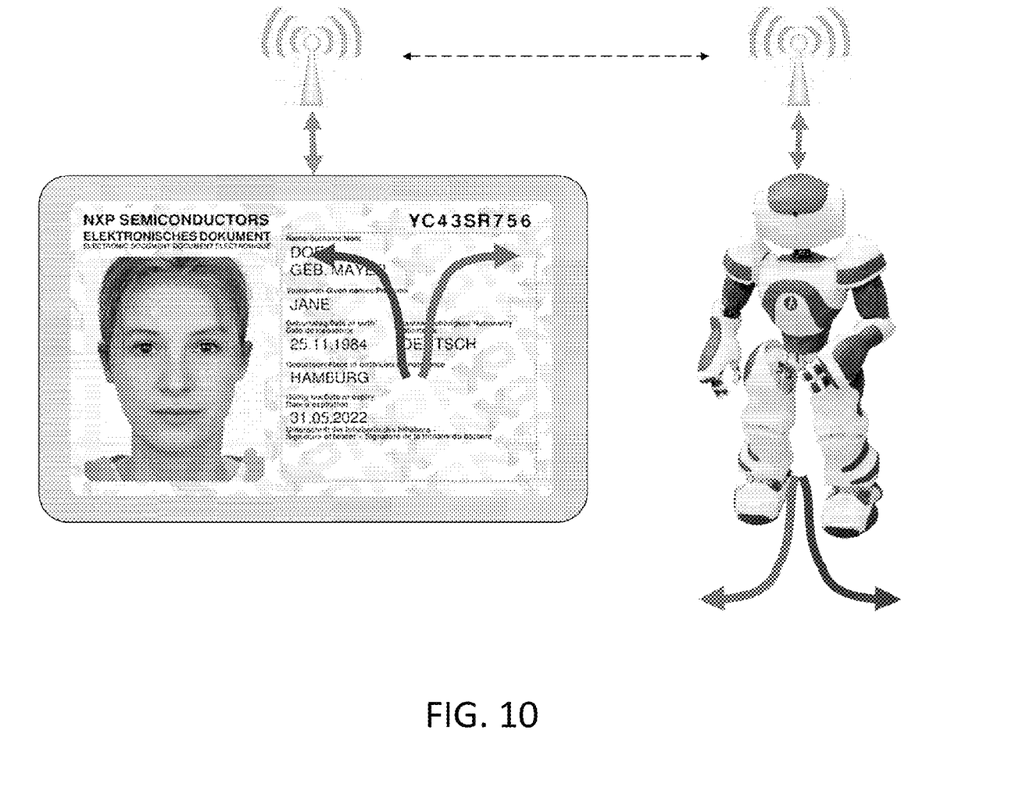
FIG. 10 illustrates controlling a robot by means of a smart card.

FIG. 10 illustrates controlling a robot by means of a smart card. In this example, the controllable object is a robot that shall be moved in a two-dimensional plane. The robot is connected by a wireless communication link (e.g. Bluetooth or WLAN) to a PC or laptop (not shown). A contactless reader is connected to the same PC/laptop. An authentication application requests the user to enter his authentication data (PIN). Upon successful entry and verification of the authentication data, the link between the smart card and the PC/laptop is enabled. Also, the tactile sensing user interface on the smart card is configured as a pointing device. As long as the user touches the tactile sensing user interface with his finger position data are generated, which may be encrypted and transmitted to the PC/laptop. A control application executable by the PC/laptop may decrypt and translate the position data obtained from the tactile sensing user interface into a format readable by the robot with the purpose to control the robot, such that it moves in the requested direction. It is noted that data communicated between the PC/laptop and the robot may also be encrypted. As soon as the user removes the smart card from the RF field generated by the contactless reader, the data link to the robot is de-established and the robot is brought into a safe mode (for example speed=zero, direction=zero degrees). A short fingertip on the tactile sensing user interface may be translated into toggling the robot's video camera on or off. Through a WLAN-connection the video stream may be sent to the controlling application running on the PC/laptop.

Figure 11:
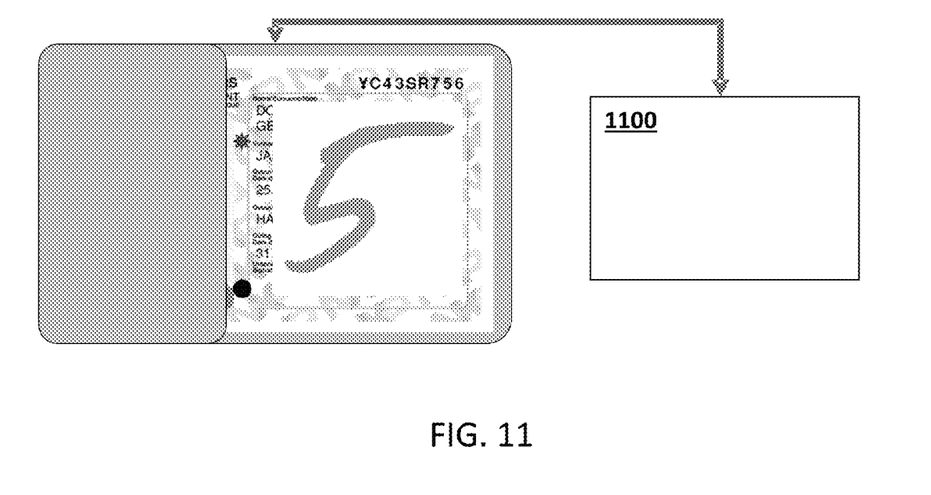
FIG. 11 illustrates authenticating towards a manufacturing process by means of a smart card.
Figure 12:
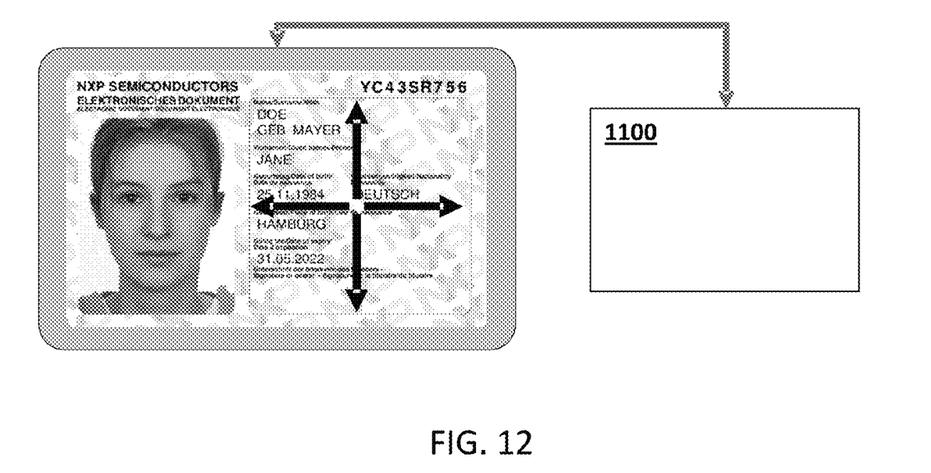
FIG. 12 illustrates controlling a manufacturing process by means of a smart card.

FIG. 11 illustrates authenticating towards a manufacturing process by means of a smart card. More specifically, a smart card of the kind set forth is used for authenticating a user towards a manufacturing process control interface 1100. FIG. 12 illustrates controlling a manufacturing process by means of a smart card. More specifically, a smart card of the kind set forth is used for providing control data to a manufacturing process control interface 1100.

In a more specific application, the controllable object is a manufacturing process control interface 1100. A contact-based reader may be connected to the manufacturing process control interface 1100. An authentication application running on the manufacturing process control interface 1100 may request the user to enter his access information (for example a PIN). Upon successful entry and verification of the access information, control over the manufacturing process control interface may be enabled such that keyboard and/or mouse information can be provided to the manufacturing process control interface 1100.

The smart card may also be connected to the manufacturing process control interface 1100 through a contactless reader. As long as the user provides input to the tactile sensor embedded in the smart card, position data may be sent to the manufacturing process control interface 1100, and the manufacturing process control interface 1100 may translate said position data into control data in the form of keyboard or mouse data for controlling the manufacturing process. As soon as the user removes the smart card from the contactless reader, the control session can be terminated and the user can be logged off. In addition, there may be a need to read out a log of executed control operations. In such cases it may be feasible to provide the logged control information through available external displays, such as the display of an NFC-enabled mobile device or a PC/Laptop connected through a contact-based or contactless interface.

Figure 13:
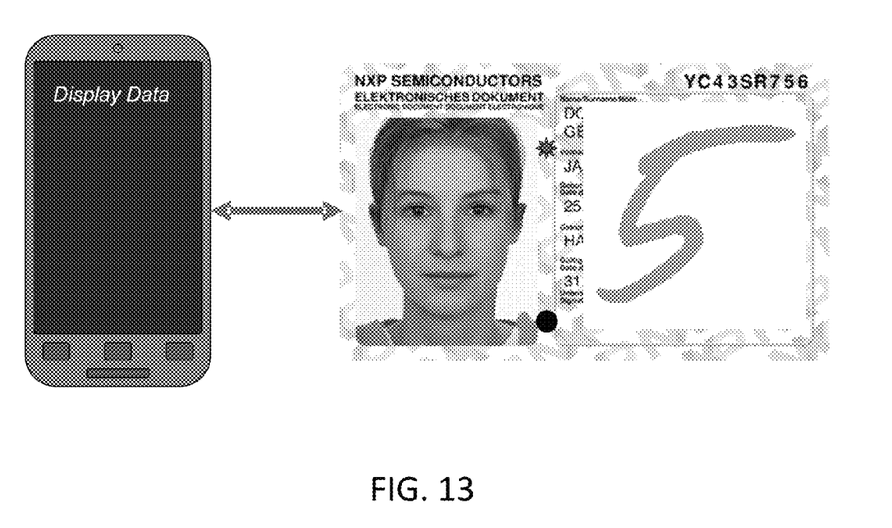
FIG. 13 illustrates the transfer of display data to a mobile phone via NFC.

FIG. 13 illustrates the transfer of display data to a mobile phone via NFC. In particular, an NFC-enabled mobile device may be used to read out information from a contactless or dual-interface smart card. The following steps may be performed in order to display feedback data reflecting, for example, the status of control actions performed on the controllable object, to a user: start a mobile device application; attach a contactless or dual-interface card to the mobile device; the mobile device requests feedback data (query); the mobile device reads feedback data via NFC; the mobile device application displays feedback data; the user checks the feedback data; the user detaches the card; the mobile device application is terminated upon smart card removal.

Figure 14:
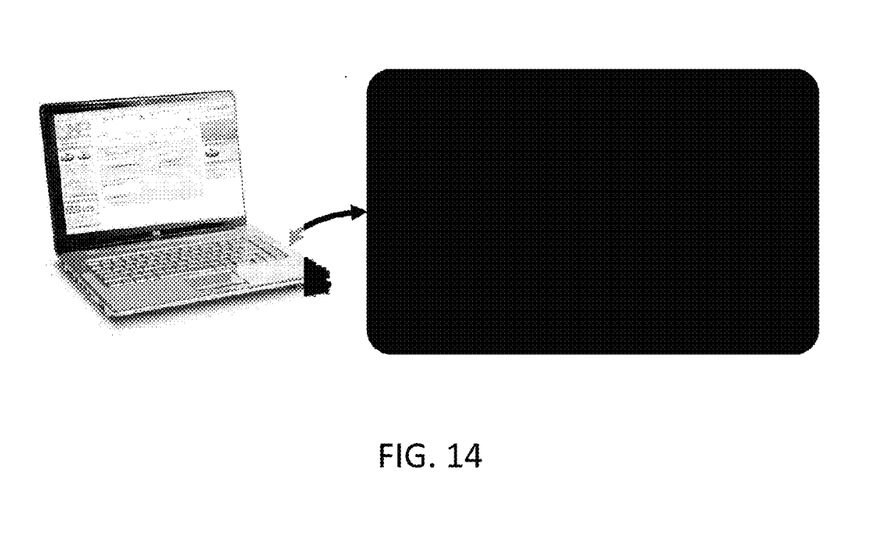
FIG. 14 illustrates the transfer of display data to a PC through a contactless reader device.

FIG. 14 illustrates the transfer of display data to a PC through a contactless reader device. In particular, a PC/laptop in combination with a contactless reader may be used to read out information from a contactless or dual-interface smart card. The following steps may be performed in order to display feedback data reflecting, for example, the status of control actions performed on the controllable object, to a user: start a PC application; attach a contactless or dual-interface card to a reader; the PC requests feedback data (query); the PC reads the feedback data through the reader; the PC application displays the feedback data; the user checks the feedback data; the user detaches the card; the PC application is terminated upon smart card removal.

Figure 15:
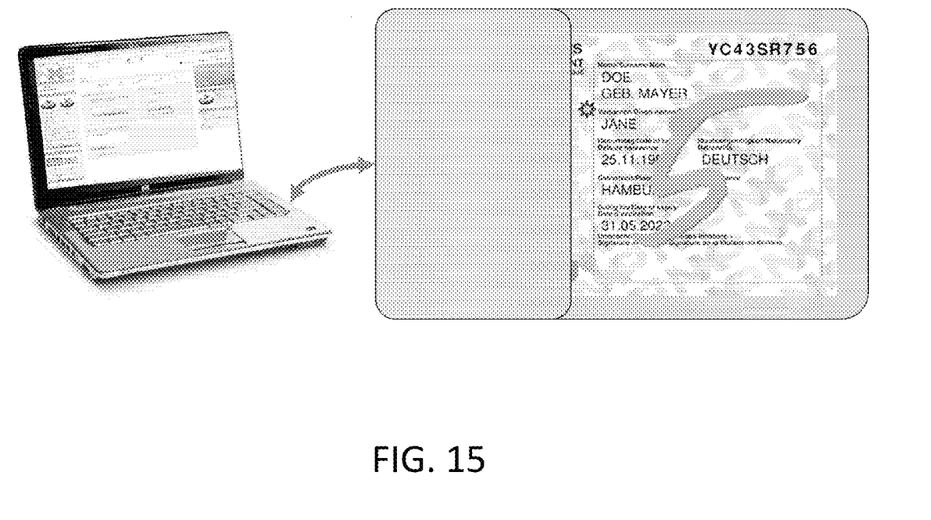
FIG. 15 illustrates the transfer of display data to a PC through a contact-based reader device.

FIG. 15 illustrates the transfer of display data to a PC through a contact-based reader device. In particular, a PC/laptop in combination with a contact-based reader may be used to read out information from a contact-bound or dual-interface smart card. The following steps may be performed in order to display feedback data reflecting, for example, the status of control actions performed on the controllable object, to a user: start a PC application; attach a contact-bound or dual-interface card to a reader; the PC requests feedback data (query); the PC reads the feedback data through the reader; the PC application displays the feedback data; the user checks the feedback data; the user detaches the card; the PC application is terminated upon smart card removal.

Finally, it is noted that the drawings are schematic. In different drawings, similar or identical elements are provided with the same reference signs. Furthermore, it is noted that in an effort to provide a concise description of the exemplary embodiments, implementation details which fall into the customary practice of the skilled person may not have been described. It should be appreciated that in the development of any such implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

The above-mentioned embodiments illustrate rather than limit the invention, and the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. The invention may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE NUMBERS 100 contactless smart card
200 dual-interface smart card
300 smart card architecture
302 storage unit
304 central processing unit
306 cryptographic device
308 RFID interface
310 antenna
312 storage unit
314 central processing unit
316 contact interface
318 power unit
320 input structures
322 output structures
324 status indicator
326 input/output ports
400 smart card architecture
500 smart card architecture
600 bottom foil
602 system inlay
604 tactile interface
606 compensation layer
608 cut-out
610 top foil
612 contact interface module
614 assembled smart card
700 tactile sensor interface
702 tactile patterns
704 tactile pattern conditioner
706 mode selector
900 system on smart card
902 dual-interface smart card
904 tactile interface
906 optical feedback indicator
908 additional feedback unit
1100 manufacturing process control interface

The invention claimed is:

1. A smart card comprising:
a two-dimensional tactile sensing user interface; and
a near-field communication (NFC) interface;
wherein said two-dimensional tactile sensing user interface is adapted to capture a stream of authentication data corresponding to a first sequence of positions of a finger engaging with said two-dimensional tactile sensing user interface and representing a user-specific credential for accessing a function of a controllable object, said smart card being adapted to transmit said stream of authentication data to the controllable object via said NFC interface in order to access said function; and
wherein said two-dimensional tactile sensing user interface is further adapted to capture a stream of control data corresponding to a second sequence of positions of the finger engaging with said two-dimensional tactile sensing user interface after said function is accessed and representing input data for controlling said function of the controllable object, said smart card being adapted to transmit said stream of control data to the controllable object via said NFC interface in order to control said function.

2. The smart card as claimed in claim 1, further being adapted to support multi-factor user authentication.

3. The smart card as claimed in claim 1, the smart card further comprising a storage unit, wherein said storage unit is adapted to store access rights for accessing said function and/or control rights for controlling said function.

4. The smart card as claimed in claim 3, wherein the access rights and/or control rights are written to the smart card via the NFC interface by an NFC-enabled mobile device.

5. The smart card as claimed in claim 3, wherein the access rights and/or control rights are written to the smart card by a contactless reader or a contact-bound reader.

6. The smart card as claimed in claim 1, wherein the user-specific credential is a personal identification number.

7. The smart card as claimed in claim 1, further being adapted to generate user feedback about control operations performed on said function.

8. The smart card as claimed in claim 1, further being adapted to transmit display data to an external display device, the display data representing a log of control operations performed on said function.

9. The smart card as claimed in claim 1, further being adapted to facilitate epidemic data transport between a plurality of controllable objects.

10. A control system comprising the smart card as claimed in claim 1 and the controllable object, wherein the controllable object is adapted to receive the stream of authentication data, to verify the user-specific credential represented by said stream of authentication data, and to grant the smart card access to said function upon or after successful verification of the user-specific credential.

11. The control system as claimed in claim 10, wherein the controllable object is further adapted to send configuration data to the smart card upon or after successful verification of the user-specific credential, and wherein the smart card is further adapted to configure the two-dimensional tactile sensing user interface using said configuration data.

12. The control system as claimed in claim 10, wherein the controllable object is further adapted to send a log of control operations performed on said function to the smart card.

13. The control system as claimed in claim 10, wherein the controllable object is one of the group of: a room entrance, a building entrance, a machine, a device, a vehicle, a vessel, a software application.

14. A control method, wherein a two-dimensional tactile sensing user interface comprised in a smart card captures a stream of authentication data corresponding to a first sequence of positions of a finger engaging with said two-dimensional tactile sensing user interface and representing a user-specific credential for accessing a function of a controllable object, and wherein the smart card transmits said stream of authentication data to the controllable object via a near-field communication (NFC) interface in order to access said function, and wherein said smart card captures a stream of control data corresponding to a second sequence of positions of the finger engaging with said two-dimensional tactile sensing user interface after said function is accessed and representing input data for controlling said function of the controllable object, wherein the smart card transmits said stream of control data to the controllable object via said NFC interface in order to control said function.

* * * * *